(12) United States Patent
Katsuda

(10) Patent No.: US 12,363,235 B2
(45) Date of Patent: Jul. 15, 2025

(54) PROCESSING APPARATUS WITH MULTIPLE SETTINGS SCREENS, SETTING SYSTEM, SETTING METHOD, AND COMPUTER-READABLE INFORMATION RECORDING MEDIUM

(71) Applicant: Konica Minolta, Inc., Tokyo (JP)

(72) Inventor: Takeo Katsuda, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 18/464,766

(22) Filed: Sep. 11, 2023

(65) Prior Publication Data

US 2024/0098193 A1  Mar. 21, 2024

(30) Foreign Application Priority Data

Sep. 20, 2022  (JP) .................................. 2022-148864

(51) Int. Cl.
*H04N 1/00* (2006.01)
(52) U.S. Cl.
CPC ..... *H04N 1/00421* (2013.01); *H04N 1/00395* (2013.01); *H04N 1/00464* (2013.01); *H04N 1/00474* (2013.01); *H04N 1/00503* (2013.01); *H04N 1/00506* (2013.01)
(58) Field of Classification Search
None
See application file for complete search history.

(56) References Cited

U.S. PATENT DOCUMENTS

| | | | |
|---|---|---|---|
| 11,714,587 B2 * | 8/2023 | Kaneda | B41J 29/38 358/1.15 |
| 2012/0144329 A1 * | 6/2012 | Sasaki | G06F 3/1204 715/764 |
| 2015/0116748 A1 * | 4/2015 | Suese | H04N 1/00416 345/173 |
| 2015/0116769 A1 * | 4/2015 | Nakagawa | G06F 3/0482 345/173 |
| 2016/0037006 A1 * | 2/2016 | Takai | H04N 1/00307 358/1.15 |
| 2016/0041798 A1 * | 2/2016 | Maekawa | G06F 3/1287 358/1.15 |
| 2018/0027133 A1 * | 1/2018 | Sato | G06T 3/40 358/1.15 |
| 2020/0301621 A1 * | 9/2020 | Matsuzawa | G06F 3/1204 |
| 2023/0315364 A1 * | 10/2023 | Yoshioka | G06F 3/1256 358/1.15 |

FOREIGN PATENT DOCUMENTS

| | | | |
|---|---|---|---|
| JP | 2021043479 | * | 3/2021 |
| JP | 2021043479 A | * | 3/2021 |

* cited by examiner

*Primary Examiner* — Akwasi M Sarpong
*Assistant Examiner* — Pawan Dhingra
(74) *Attorney, Agent, or Firm* — Buchanan Ingersoll & Rooney PC

(57) ABSTRACT

A processing apparatus includes: a storage that stores a plurality of instructions; and a processor that executes the plurality of instructions. The plurality of instructions, when executed by the processor, cause the processor to perform: providing a setting screen for setting one or more items relating to the processing apparatus; and setting the one or more items in response to operation performed on the setting screen. The setting screen includes a first setting screen for receiving operation performed by a person, and a second setting screen for receiving operation automated by Robotic Process Automation.

14 Claims, 14 Drawing Sheets

FIG.12

| ID NUMBER OF EXTERNAL APPARATUS | TYPE OF SECOND SETTING SCREEN |
|---|---|
| 001 | GQ21 |
| 002 | GQ22 |
| 003 | GQ22 |
| 004 | GQ22 |
| 005 | GQ21 |
| ⋮ | ⋮ |

PROCESSING APPARATUS WITH MULTIPLE SETTINGS SCREENS, SETTING SYSTEM, SETTING METHOD, AND COMPUTER-READABLE INFORMATION RECORDING MEDIUM

The entire disclosure of Japanese Patent Application No. 2022-148864, filed on Sep. 20, 2022, is incorporated herein by reference in its entirety.

BACKGROUND

Technological Field

The present disclosure relates to a processing apparatus, a setting system including the processing apparatus and an external apparatus that displays a setting screen for the processing apparatus, a setting method for the processing apparatus, and a computer-readable information recording medium.

Description of the Related Art

In recent years, in order to automate office work using a PC (personal computer), RPA (Robotic Process Automation) Software (hereinafter referred to as "RPA") has attracted attention. The RPA is a technology for recording operation of a PC by a person and re-executing the operation to realize automation of the operation. Since the operation is automated, the same operation is repeated even if a person does not perform the operation again.

As an example of automation by the RPA, it is known that data processing and operation of a web page displayed by a web browser are automated by the RPA. When data processing and operation of a web page are automated by the RPA, identifiers (ID, XPATH (XML Path Language), Name, etc.) of elements (characters, images, buttons, tables, entry columns, etc.) in the web page need to be registered in the RPA in advance, but work for registering the identifiers of the elements in the web page is troublesome for a person, which has been a problem to be solved.

In contrast, Japanese Laid-Open Patent Publication No. 2021-43479 discloses a technology for simplifying the operation of registering identifiers of elements in a web page in the RPA in advance.

SUMMARY

The technology disclosed in Japanese Laid-Open Patent Publication No. 2021-43479 simplifies pre-registration work that is required in a case where data processing and operation of a web page to be displayed by a web browser are automated by the RPA. However, in a case where the operation performed on the setting screen displayed by the web browser is automated by the RPA, since the setting screen is configured so as to be easily operated by a person, there is a new problem that an unintended operation (erroneous operation) may be performed even in a case where the operation is automated as operated by a person.

One object of the present disclosure is to prevent an unintended operation (erroneous operation) from being performed in a case where an operation performed on a setting screen displayed by a web browser is automated by the RPA.

To achieve at least one of the above-mentioned objects, according to an aspect of the present invention, a processing apparatus reflecting one aspect of the present invention comprises: a storage that stores a plurality of instructions; and a processor that executes the plurality of instructions. The plurality of instructions, when executed by the processor, cause the processor to perform: providing a setting screen for setting one or more items relating to the processing apparatus; and setting the one or more items in response to operation performed on the setting screen. The setting screen includes a first setting screen for receiving operation performed by a person, and a second setting screen for receiving operation automated by Robotic Process Automation.

To achieve at least one of the above-mentioned objects, according to an aspect of the present invention, a setting system reflecting one aspect of the present invention comprises: the processing apparatus as described above; and an external apparatus that displays the setting screen for the processing apparatus.

To achieve at least one of the above-mentioned objects, according to an aspect of the present invention, a setting method for a processing apparatus reflecting one aspect of the present invention is provided. The setting method comprises: providing a setting screen for setting one or more items relating to the processing apparatus; and setting the one or more items in response to operation performed on the setting screen. The setting screen includes a first setting screen for receiving operation performed by a person, and a second setting screen for receiving operation automated by Robotic Process Automation.

To achieve at least one of the above-mentioned objects, according to an aspect of the present invention, a non-transitory computer-readable information recording medium storing a plurality of instructions reflecting one aspect of the present invention is provided. The plurality of instructions, when executed by a processor, cause the processor to perform: providing a setting screen for setting one or more items relating to a processing apparatus; and setting the one or more items in response to operation performed on the setting screen. The setting screen includes a first setting screen for receiving operation performed by a person, and a second setting screen for receiving operation automated by Robotic Process Automation.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention.

FIG. 12 is a diagram illustrating an example of a conversion table according to the second embodiment.

DETAILED DESCRIPTION OF EMBODIMENTS

Figure 1:
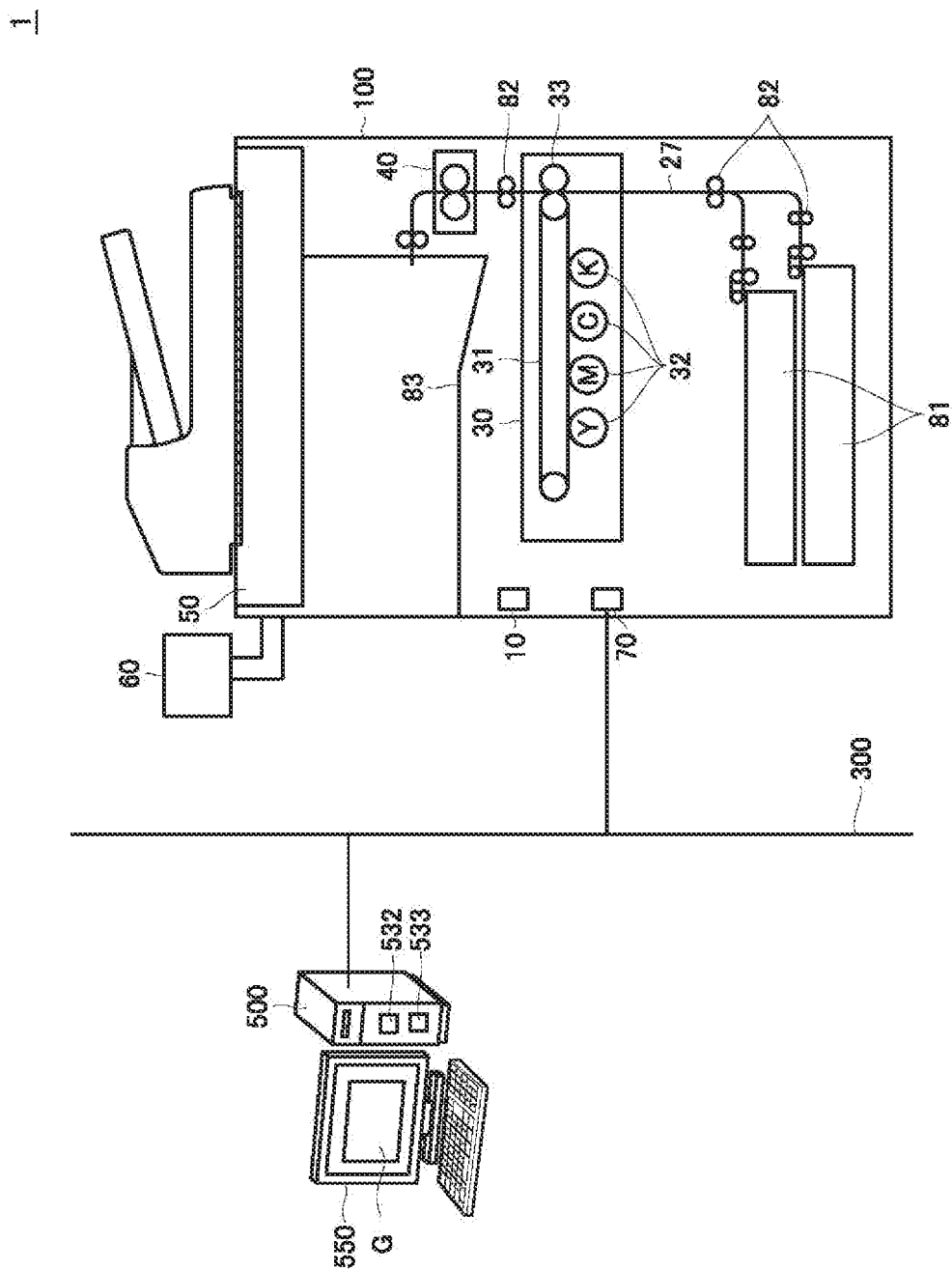
FIG. 1 is a diagram illustrating a setting system according to a first embodiment.

Hereinafter, one or more embodiments of the present invention will be described with reference to the drawings. However, the scope of the invention is not limited to the disclosed embodiments.

Hereinafter, embodiments and modification examples according to the present disclosure will be described with reference to the drawings. In the following description, the same parts and constituent elements are denoted by the same reference characters. Their names and functions are also the same. Therefore, detailed description thereof will not be repeated. Note that the embodiments and modification examples described below may be selectively combined as appropriate.

First Embodiment

<A. Setting System>

A configuration of the setting system according to the first embodiment will be described with reference to FIGS. 1 to 3. FIG. 1 is a diagram illustrating the setting system according to the first embodiment.

The setting system 1 according to the first embodiment includes a processing apparatus 100 and an external apparatus 500 that displays a setting screen G for setting one or more items relating to the processing apparatus 100. The processing apparatus 100 and the external apparatus 500 are configured to be communicable with each other. As an example, the processing apparatus 100 and the external apparatus 500 communicate with each other via a network 300.

The processing apparatus 100 is an apparatus that provides a setting screen G, which can be displayed by a web browser 532, to the external apparatus 500 and can perform setting in response to an operation on the setting screen G displayed on the external apparatus 500. For example, the processing apparatus 100 is an apparatus used in an office, an apparatus used in a factory, a home appliance, a communication device such as a router, or the like. In the present embodiment, an image processing apparatus that forms an image on a sheet by an electrophotographic method is employed as the processing apparatus 100.

The external apparatus 500 is a general-purpose computer including a display device 550. The external apparatus 500 is equipped with a web browser 532 and RPA (Robotic Process Automation) software 533 (hereinafter referred to as "RPA 533"). The setting screen G provided from the processing apparatus 100 is displayed on the display device 550 by the web browser 532. The RPA 533 is software that records an operation on the setting screen G and re-executes the recorded operation to realize automation of the operation.

The setting screen G includes a first setting screen for receiving an operation by a person and a second setting screen for receiving an operation automated by the RPA 533. One or more items relating to the processing apparatus 100 can be set from any screen of the first setting screen and the second setting screen. The first setting screen is configured to be easily operated by a person. On the other hand, the second setting screen is configured to easily record an operation. This is because the second setting screen also functions as a screen for registering, in the external apparatus 500, the operation of the automation target by the RPA 533. The external apparatus 500 records (registers) an operation performed on the second setting screen by a person, and re-executes the operation at the instructed timing.

It may be difficult to record an operation on the first setting screen that is configured to be easily operated by a person. Therefore, in a case where an operation on the first setting screen is automated by the RPA 533, an unintended operation (erroneous operation) may be performed. On the other hand, the second setting screen is configured to easily record an operation. Therefore, when the operation on the second setting screen is automated by the RPA 533, it is possible to prevent an unintended operation (erroneous operation) from being performed.

Note that the setting system 1 may include a plurality of external apparatuses to which the setting screen G is provided by the processing apparatus 100.

Figure 2:
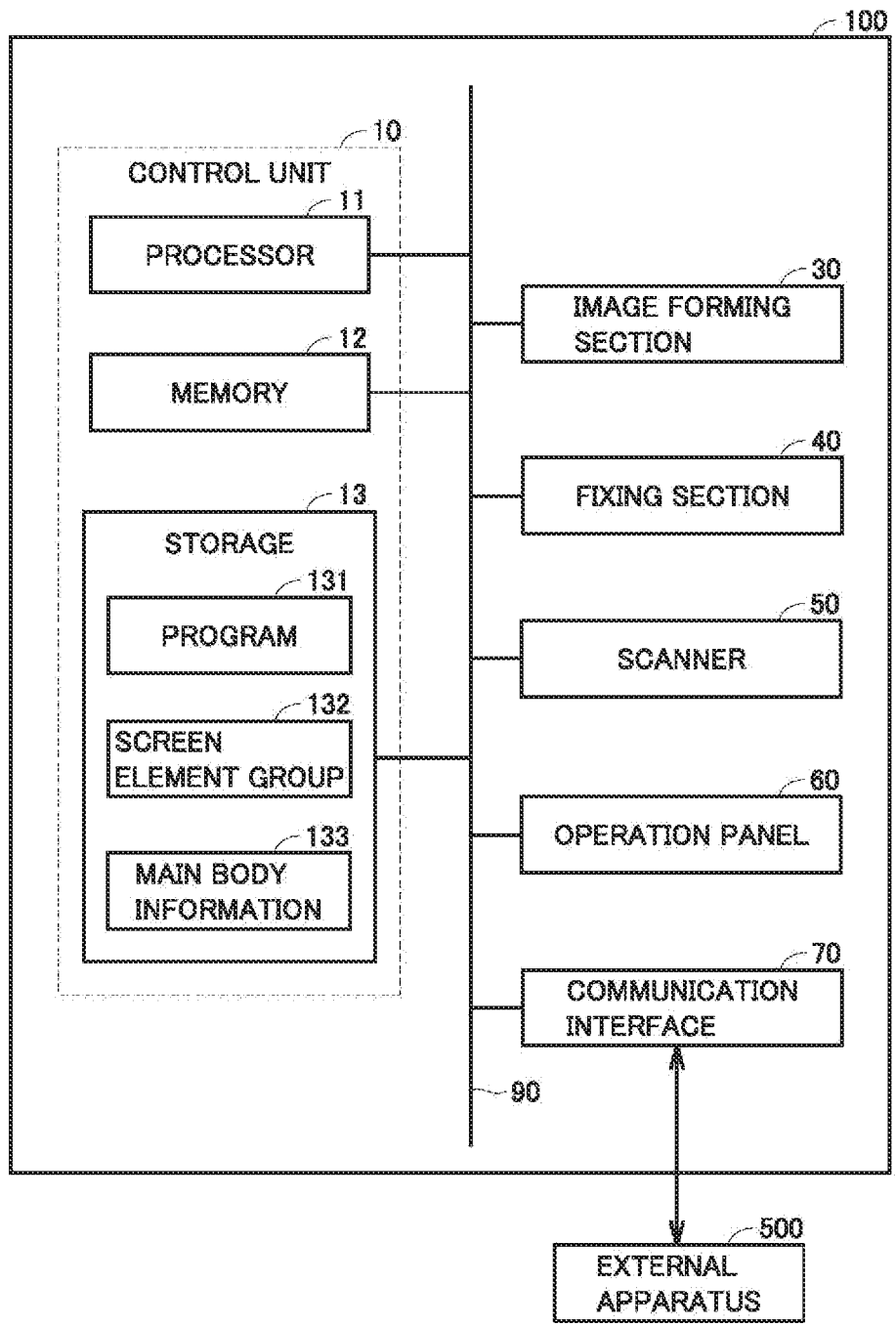
FIG. 2 is a diagram illustrating an example of a hardware configuration of a processing apparatus according to the first embodiment.

FIG. 2 is a diagram illustrating an example of a hardware configuration of the processing apparatus according to the first embodiment. Referring to FIGS. 1 and 2, the processing apparatus 100 includes a control unit 10, an image forming section 30, a fixing section 40, a scanner 50, an operation panel 60, a communication interface 70, a sheet feed tray 81, a conveyance roller 82, a sheet ejection tray 83, a conveyance path 27, and a bus 90. The control unit 10, the image forming section 30, the fixing section 40, the scanner 50, the operation panel 60, and the communication interface 70 are connected to each other via the bus 90.

The control unit 10 includes a processor 11, a memory 12, and a storage 13. The processor 11 is constituted of, for example, a central processing unit (CPU), a micro-processing unit (MPU), or the like. The memory 12 is constituted of, for example, a volatile storage device such as a dynamic random access memory (DRAM) or a static random access memory (SRAM). The storage 13 is constituted of, for example, a non-volatile storage device such as a hard disk drive (HDD), a solid state drive (SSD), or a flash memory.

The storage 13 stores a program 131, a screen element group 132, and main body information 133. The program 131 includes a plurality of computer-readable instructions for controlling the processing apparatus 100. The programs 131 includes a screen generating program (so-called web server) for generating a setting screen G based on the screen element group 132 and the main body information 133 and providing the setting screen G to the external apparatus 500. The program 131 is an example of the "setting program" in the present disclosure. The setting program may be installed from a storage medium such as a memory card into the processing apparatus 100, or may be downloaded from a distribution server and installed into the processing apparatus 100.

The program 131 may be provided not as a single program but as a part of an arbitrary program. In this case, the processing according to the present embodiment is realized in cooperation with the arbitrary program. Even a program that does not include such a part of modules does not depart from the gist of the processing apparatus 100 according to the present embodiment. A part or all of the functions provided by the program 131 may be realized by dedicated hardware.

The processor 11 controls each component of the processing apparatus 100 by executing the program 131. For example, the processor 11 causes the image forming section 30, the conveyance rollers 82, and the fixing section to operate based on image data to form an image on a sheet. The image data may be image data generated by the scanner 50 or image data received from an apparatus (e.g., the external apparatus 500) that can communicate with the processing apparatus 100.

The screen element group 132 includes elements constituting the setting screen G. The main body information 133 includes information indicating an optional configuration of the processing apparatus 100 (for example, information indicating that a scanner function is incorporated, information indicating that a FAX function is incorporated, or the like).

The image forming section 30 forms an image by applying toner (color material) to a sheet supplied from the sheet feed tray 81. The image forming section 30 includes an intermediate transfer belt 31, image forming units 32, and a transfer roller 33. The intermediate transfer belt 31 is an endless belt-like member that is stretched around a plurality of rollers and circularly moves. The image forming units 32 are arranged along the intermediate transfer belt 31, and form toner images of respective colors of Y (yellow), M (magenta), C (cyan), and K (black) on the intermediate transfer belt 31 based on the image data. When a sheet passes through a nip portion formed between the intermediate transfer belt 31 and the transfer roller 33, a toner image is transferred to the sheet and an image is formed.

The fixing section 40 fixes the toner image on the sheet by heating and pressurizing the sheet to which the toner image has been transferred. The fixing section 40 includes a pair of rollers constituted of a heating roller and a pressure roller that sandwich the sheet. The sheet on which the toner image has been fixed is conveyed by the conveyance roller 82 and ejected to the sheet ejection tray 83.

The scanner 50 includes an optical system such as a light source and a reflecting mirror, and an imaging element, and reads an image of a sheet conveyed through a predetermined conveyance path or a sheet placed on platen glass, and generates image data in the bitmap format for each of the colors: red (R), green (G), and blue (B).

The operation panel 60 includes a display device such as a liquid crystal display and an input device such as a touch screen arranged to be superimposed on a screen of the display device. The operation panel 60 displays various kinds of information such as an operation status and a processing result of the processing apparatus 100, converts an input operation into a signal, and outputs the signal to the processor 11.

The communication interface 70 is constituted of a network card or the like. The communication interface 70 is connected to a communication network such as a local area network (LAN) so as to transmit information to and receive information from an apparatus (for example, the external apparatus 500 or the like) on the communication network. In one aspect, the processor 11 receives an instruction to provide the setting screen G, from the external apparatus 500 via the communication interface 70. In another aspect, the processor 11 provides the setting screen G to the external apparatus 500 via the communication interface 70. In another aspect, the processor 11 receives an operation signal corresponding to an operation on the setting screen G, from the external apparatus 500 via the communication interface 70.

In the sheet feed tray 81, sheets before image formation are stored. The conveyance roller 82 rotates while pinching a single sheet to convey the sheet along the conveyance path 27. A sheet on which an image is formed is placed on the sheet ejection tray 83.

Figure 3:
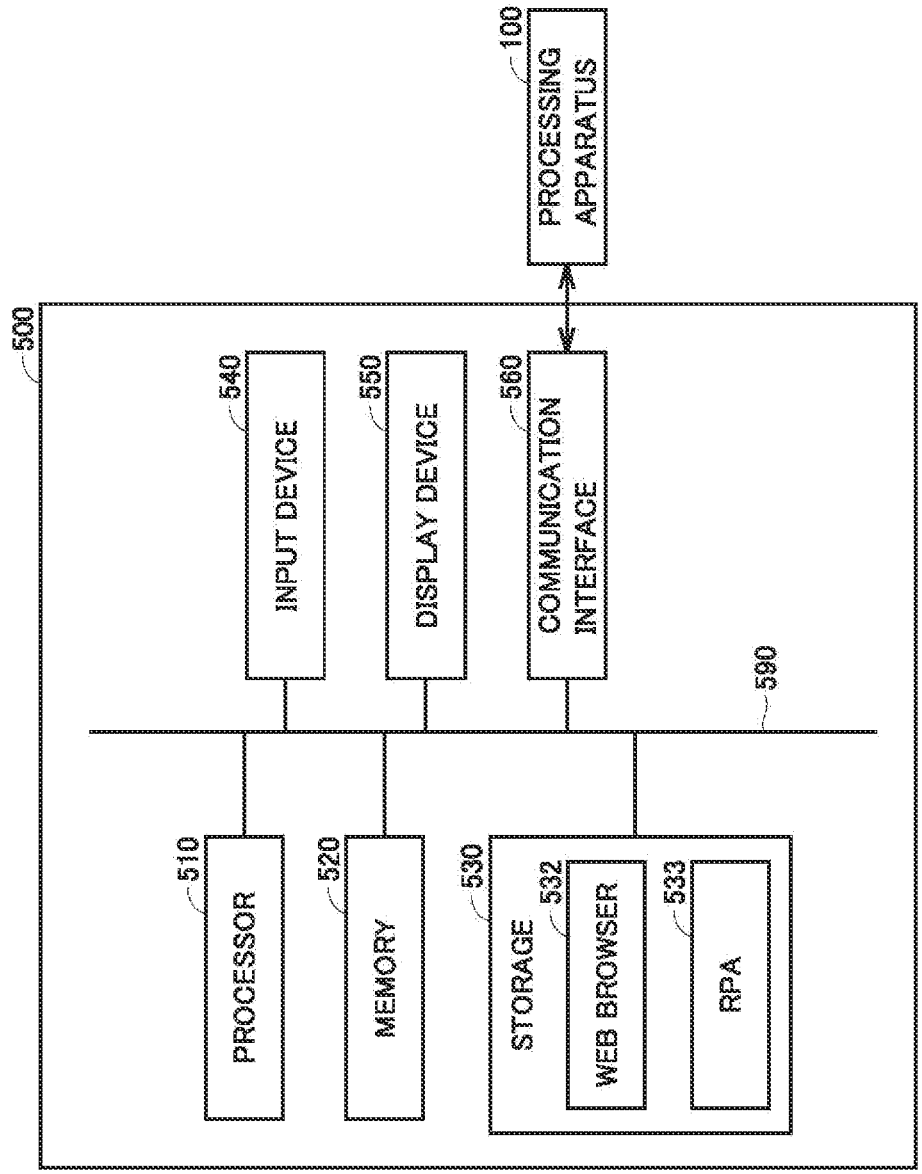
FIG. 3 is a diagram illustrating an example of a hardware configuration of an external apparatus according to the first embodiment.

FIG. 3 is a diagram illustrating an example of a hardware configuration of the external apparatus according to the first embodiment. The external apparatus 500 includes a processor 510, a memory 520, a storage 530, an input device 540, a display device 550, and a communication interface 560. The processor 510, the memory 520, the storage 530, the input device 540, the display device 550, and the communication interface 560 are connected to each other via a bus 590.

The processor 510 is constituted of, for example, a CPU or an MPU. The memory 520 is constituted of, for example, a volatile storage device such as a DRAM or an SRAM. The storage 530 is constituted of, for example, a nonvolatile storage device such as an HDD, an SSD, or a flash memory.

The storage 530 stores the web browser 532, the RPA 533, and a program for controlling each component of the external apparatus 500.

The input device 540 (e.g., a mouse, a keyboard, a touch sensor, or the like) receives an operation performed on the setting screen G displayed on the display device 550, and outputs an operation signal corresponding to the operation, to the processor 510. The display device 550 (e.g., a display) displays the setting screen G received from the processing apparatus 100.

The communication interface 560 is connected to a communication network such as a LAN so as to transmit information to and receive information from an apparatus (e.g., the processing apparatus 100) on the communication network. In one aspect, the processor 510 transmits an instruction to provide the setting screen G, to the processing apparatus 100 via the communication interface 560. In another aspect, the processor 510 receives the setting screen G from the processing apparatus 100 via the communication interface 560. In another aspect, the processor 510 transmits an operation signal corresponding to an operation on the setting screen G, to the processing apparatus 100 via the communication interface 560.

<B. Setting Screen>

The setting screen G (the first setting screen and the second setting screen) according to the first embodiment will be described with reference to FIGS. 4 and 5.

Figure 4:
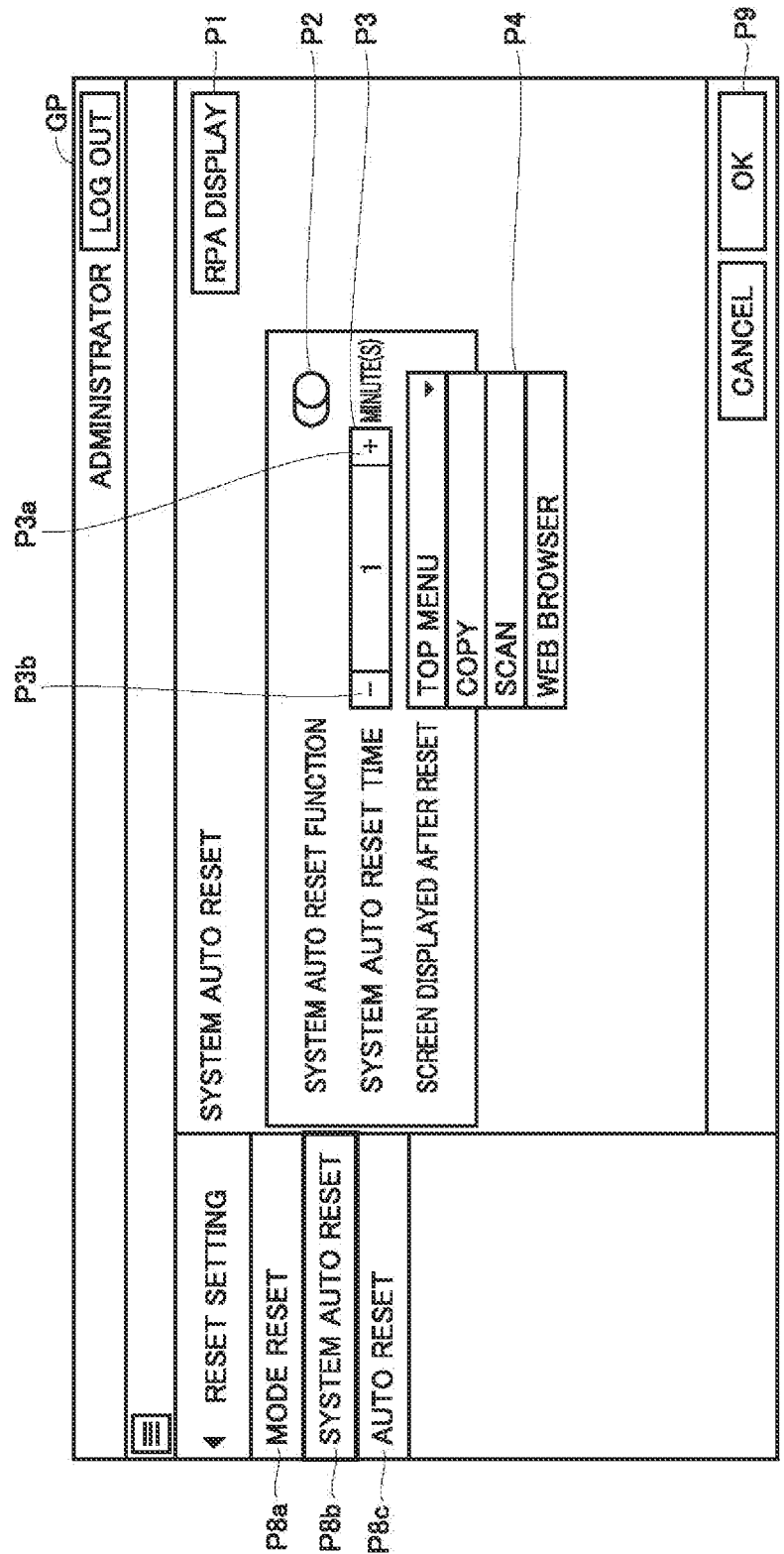
FIG. 4 is a diagram illustrating an example of a first setting screen according to the first embodiment.

FIG. 4 is a diagram illustrating an example of the first setting screen according to the first embodiment. The first setting screen GP is generated based on the screen element group 132 and the main body information 133, and is stored in the storage 13 of the processing apparatus 100. The processing apparatus 100 provides the first setting screen GP to the external apparatus 500 in a case where the instruction to provide the setting screen is received from the external apparatus 500. The first setting screen GP is displayed on the display device 550 of the external apparatus 500.

The first setting screen GP is a setting screen for receiving an operation performed by a person. The first setting screen GP is composed of a plurality of layers. The screen of the first layer includes one or more items relating to a mode reset function among one or more items relating to the processing apparatus 100. The screen of the second layer includes one or more items relating to a system auto reset function among one or more items relating to the processing apparatus 100. The screen of the third layer includes one or more items relating to an auto reset function among one or more items relating to the processing apparatus 100. When a tab P8a is clicked, the screen of the first layer of the first setting screen GP is displayed on the display device 550. When a tab P8b is clicked, the screen of the second layer of the first setting screen GP is displayed on the display device 550. When a tab P8c is clicked, the screen of the third layer of the first setting screen GP is displayed on the display device 550.

In the example illustrated in FIG. 4, the screen of the second layer of the first setting screen GP is displayed on the display device 550. The "system auto reset function", the "system auto reset time", and the "screen displayed after reset" in FIG. 4 are examples of one or more items relating to the system auto reset function. Furthermore, the "screen displayed after reset" illustrated in FIG. 4 is an example of an item for selecting one or more options from among a plurality of options. The plurality of options include first options (for example, "copy", "scan", and "web browser" in FIG. 4) relating to functions which are currently available, and second options (for example, "FAX" and the like) relating to functions which are not currently available but can be added. On the first setting screen GP, first options (for example, "copy", "scan", and "web browser" in FIG. 4) relating to functions which are currently available are displayed, and second options (for example, "FAX" and the like) relating to functions which are not currently available but can be added are not displayed.

For the first setting screen GP, a user interface for improving the operability is used as an element for setting one or more items relating to the processing apparatus 100 so as to be easily operated by a person. The user interface for improving the operability includes, for example, at least one of a slide-type switch, a plus minus button, and a pulldown menu.

In the first setting screen GP shown in FIG. 4, the slide-type switch P2 is used as an element for setting ON/OFF of the system auto reset function, the plus minus button P3 is used as an element for setting a time of the system auto reset, and the pulldown menu P4 is used as an element for setting a screen to be displayed after the reset.

The slide-type switch P2 is a user interface that switches between ON and OFF of a function in response to a slide operation on the switch. In the case where the slide-type switch P2 is used as an element for switching between ON and OFF of a function, the function can be switched between ON and OFF only by sliding the switch, so that the operability is improved.

The plus minus button P3 is a user interface for receiving input of a numerical value in response to a click operation on the plus minus button P3. The plus minus button P3 includes a first button P3a for increasing the numerical value and a second button P3b for decreasing the numerical value. When the plus minus button P3 is used as an element for inputting a numerical value, it is not necessary to manually input a numerical value by switching from a mouse to a keyboard, and thus the operability is improved.

The pulldown menu P4 is a user interface for selecting one or more options from a plurality of options. As described above, the plurality of options include the first options relating to currently available functions and the second options relating to functions that are not currently available but can be added, however, the options displayed on the first setting screen GP are only the first options. Therefore, even a person unfamiliar with the setting operation can perform the operation without being confused.

Since the options are visible only when the pulldown menu P4 is open, the amount of information constantly displayed on the first setting screen GP is reduced when the pulldown menu P4 is used as an element for selecting one or more options from among a plurality of options. Therefore, the number of scroll operations is reduced, and the operability is improved.

The first setting screen GP further includes a button P1 and a button P9. The button P1 is an example of an element for switching the first setting screen GP to the second setting screen GQ illustrated in FIG. 5. In a case where the button P1 is operated (for example, clicked), the second setting screen GQ is displayed on the display device 550 instead of the first setting screen GP. The element for switching the first setting screen GP to the second setting screen GQ may be a tab or a switch.

The button P9 is an element for applying the item set on the first setting screen GP to the processing apparatus 100. In a case where the button P9 is clicked, the processing apparatus 100 sets the item set on the first setting screen GP.

The first setting screen GP may include a display for assisting the setting operation such that even a person unfamiliar with the setting operation can perform the setting operation without any problem. The display for assisting the setting operation includes, for example, at least one of a description regarding the setting item, an illustration regarding the setting item, a description regarding the operation, and an illustration regarding the operation. The display for assisting the setting operation may always be displayed on the first setting screen GP, or may be displayed only when a predetermined operation (for example, an operation of clicking a predetermined button) is performed.

The first setting screen GP may further include a button for opening a pop-up window. The pop-up window includes elements (for example, a slide-type switch, a plus minus button, a pulldown menu, and the like) for setting some items relating to the processing apparatus 100. By using the pop-up window, the amount of information constantly displayed on the first setting screen GP is reduced. Therefore, the number of scroll operations is reduced, and the operability is improved.

Figure 5:
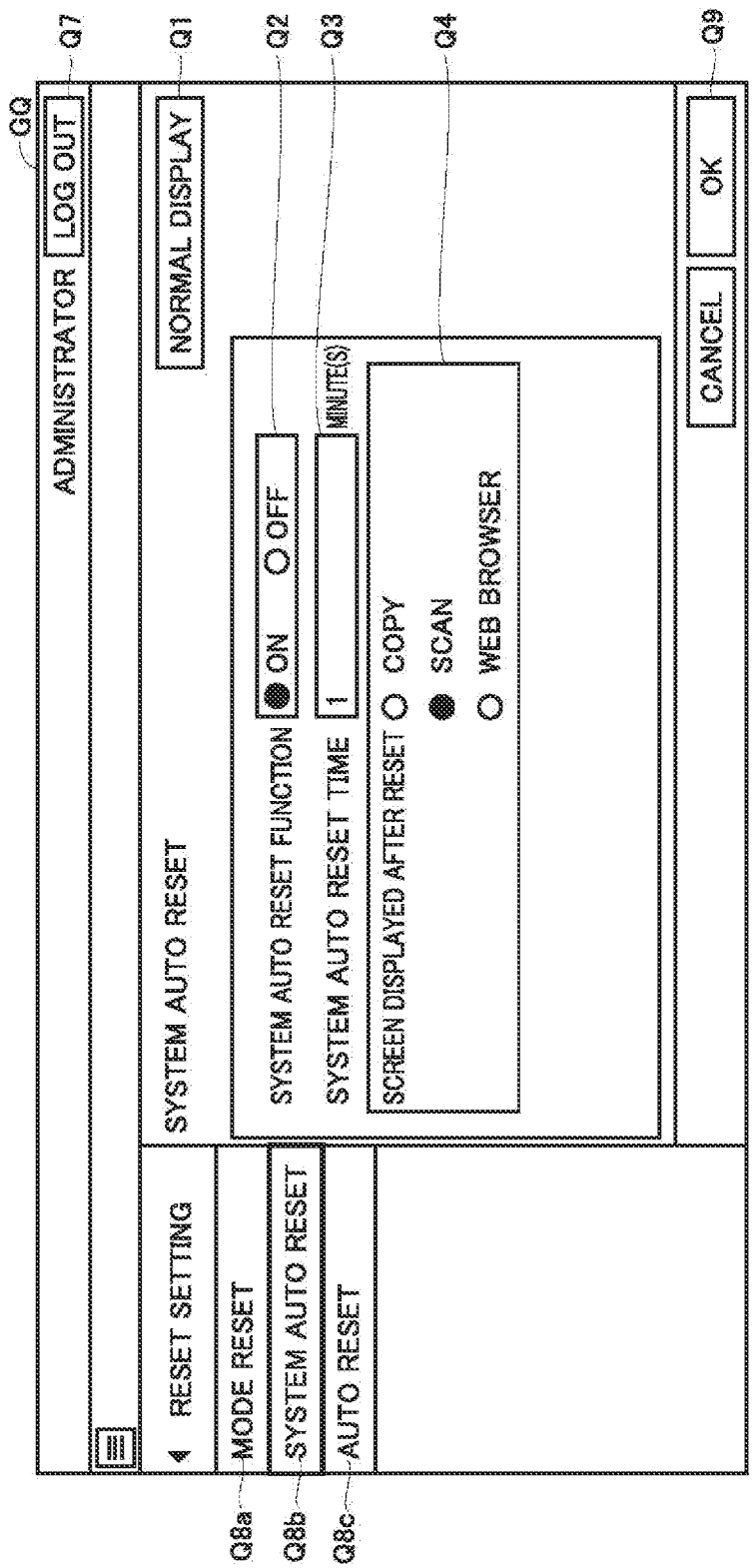
FIG. 5 is a diagram illustrating an example of a second setting screen according to the first embodiment.

FIG. 5 is a diagram illustrating an example of the second setting screen according to the first embodiment. The second setting screen GQ is generated based on the screen element group 132 and the main body information 133, and is stored in the storage 13 of the processing apparatus 100. In a case where the switching instruction to switch to the second setting screen GQ is received, the processing apparatus 100 provides the second setting screen GQ to the external apparatus 500. As an example, in a case where the operation signal indicating that the button P1 illustrated in FIG. 4 is clicked is received from the external apparatus 500, the processing apparatus 100 determines that the switching instruction to switch to the second setting screen GQ is received. The second setting screen GQ is displayed on the display device 550 of the external apparatus 500.

The second setting screen GQ is a setting screen for receiving an operation automated by the RPA. The second setting screen GQ is also composed of a plurality of layers. The screen of the first layer includes one or more items relating to the mode reset function among one or more items relating to the processing apparatus 100. The screen of the second layer includes one or more items relating to the system auto reset function among one or more items relating to the processing apparatus 100. The screen of the third layer includes one or more items relating to the auto reset function among one or more items relating to the processing apparatus 100. When the tab Q8a is clicked, the screen of the first layer of the second setting screen GQ is displayed on the display device 550. When the tab Q8b is clicked, the screen of the second layer of the second setting screen GQ is displayed on the display device 550. When the tab Q8c is clicked, the screen of the third layer of the second setting screen GQ is displayed on the display device 550.

In the example shown in FIG. 5, the screen of the second layer of the second setting screen GQ is displayed on the display device 550. The "system auto reset function", the "system auto reset time", and the "screen displayed after reset" in FIG. 5 are examples of one or more items relating to the system auto reset function. The "screen displayed after reset" in FIG. 5 is an example of an item for selecting one or more options from among a plurality of options. The plurality of options include first options (for example, "copy", "scan", and "web browser" in FIG. 5) relating to functions that are currently available, and second options (for example, "FAX" and the like) relating to functions that are not currently available but can be added. On the second setting screen GQ, first options (for example, "copy", "scan", and "web browser" in FIG. 5) relating to functions that are currently available are displayed, and second options (for example, "FAX" and the like) relating to functions that are not currently available but can be added are not displayed.

In the second setting screen GQ, a user interface for easily recording an operation is used as an element for setting one or more items relating to the processing apparatus 100 so that the operation is easily recorded. The user interface for easily recording an operation includes, for example, at least one of a radio button, a checkbox, and a text box.

In the second setting screen GQ illustrated in FIG. 5, a radio button Q2 is used as an element for setting ON/OFF of the system auto reset function, a text box Q3 is used as an element for setting a time of the system auto reset, and a radio button Q4 is used as an element for setting a screen to be displayed after the reset. The radio buttons Q2 and Q4 are user interfaces for selecting one option from among a plurality of options.

In the case of the radio button, the option is always displayed on the screen, and the option can be selected by clicking a button corresponding to the option or a character string corresponding to the option. The checkbox is a user interface for selecting two or more options from several options. In the case of the checkbox, options are always displayed in the screen, and an option can be selected by clicking a button corresponding to the option or a character string corresponding to the option. The text box Q3 is a user interface for receiving input of a numerical value in response to an operation on the keyboard.

The operation on the user interface used for the first setting screen GP may be difficult to record and may not be suitable for automation. For example, the operation on the slide-type switch P2 includes an operation of sliding the switch while pressing the switch for a long time, but it is difficult to record such an operation. In addition, since the number of times the operation is performed tends to increase in a case where a numerical value is input by operation on the plus minus buttons P3, it is difficult to record the operation on the plus minus buttons P3. In addition, since the layout of the screen is different between the state where the pulldown menu P4 is opened and the state where the pulldown menu P4 is closed, it is difficult to record the operation on the pulldown menu P4.

On the other hand, in the case of the radio buttons Q2 and Q4, the layout of the screen is not changed unlike the pulldown menu P4. Furthermore, in the case of the checkbox, the layout of the screen does not change unlike the pulldown menu P4. In addition, in the case of the text box Q3, it is only necessary to record the operation on the keyboard. Therefore, the operations on the radio buttons Q2 and Q4, the operation on the checkbox, and the operation on the text box Q3 are easy to record and suitable for automation.

The second setting screen GQ further includes a button Q1, a button Q7, and a button Q9. The button Q1 and the button Q7 are examples of an element for switching the second setting screen GQ to the first setting screen GP illustrated in FIG. 4. In a case where the button Q1 or the button Q7 is clicked, the first setting screen GP is displayed on the display device 550 instead of the second setting screen GQ. The element for switching the second setting screen GQ to the first setting screen GP may be a tab or a switch.

The button Q9 is an element for applying the item set on the second setting screen GQ to the processing apparatus 100. In a case where the button Q9 is clicked, the processing apparatus 100 sets the item set on the second setting screen GQ.

Note that a person who performs an operation to be automated using the second setting screen GQ in order to cause the external apparatus 500 to record the operation to be automated is often familiar with the setting operation for the processing apparatus 100. Accordingly, the second setting screen GQ may be less than the first setting screen GP, in terms of an amount of displayed contents for assisting the setting operation. Further, by reducing the amount of contents displayed in the second setting screen GQ for assisting the setting operation, relative to the first setting screen GP, the second setting screen GQ may be composed of layers less than layers of the first setting screen GP.

<C. Setting Process>

Figure 6:
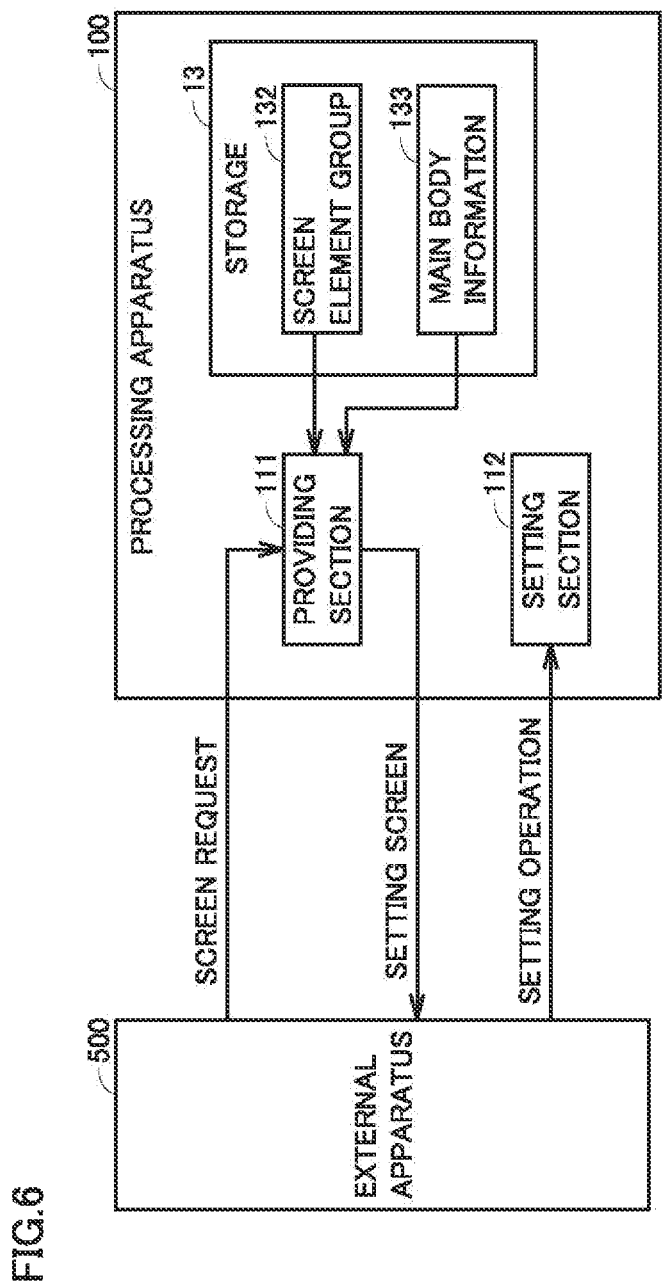
FIG. 6 is a diagram for describing an overview of a setting process performed by the processing apparatus according to the first embodiment.
Figure 7:
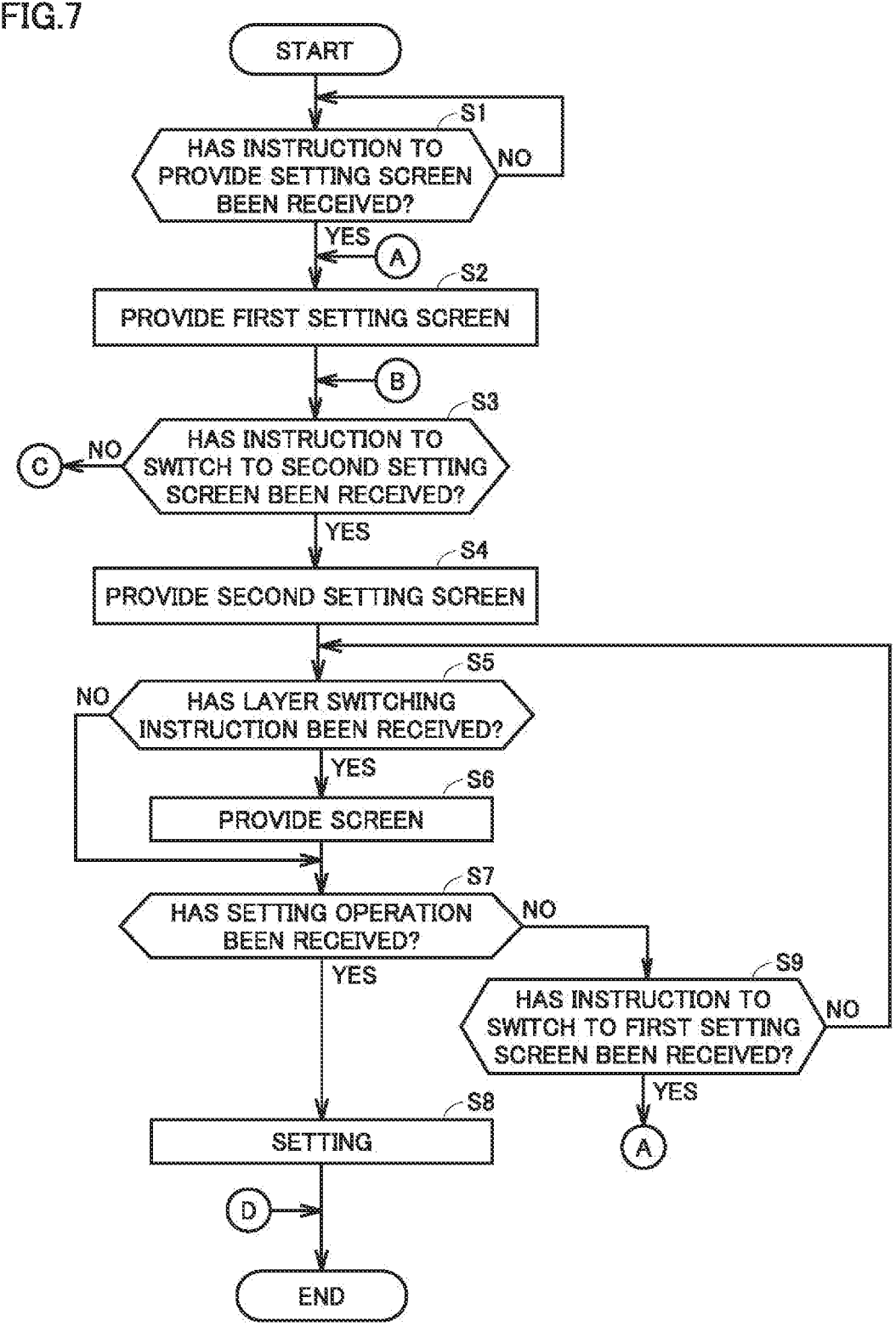
FIG. 7 is a flowchart illustrating a part of a sequence of a setting process performed by the processing apparatus according to the first embodiment.
Figure 8:
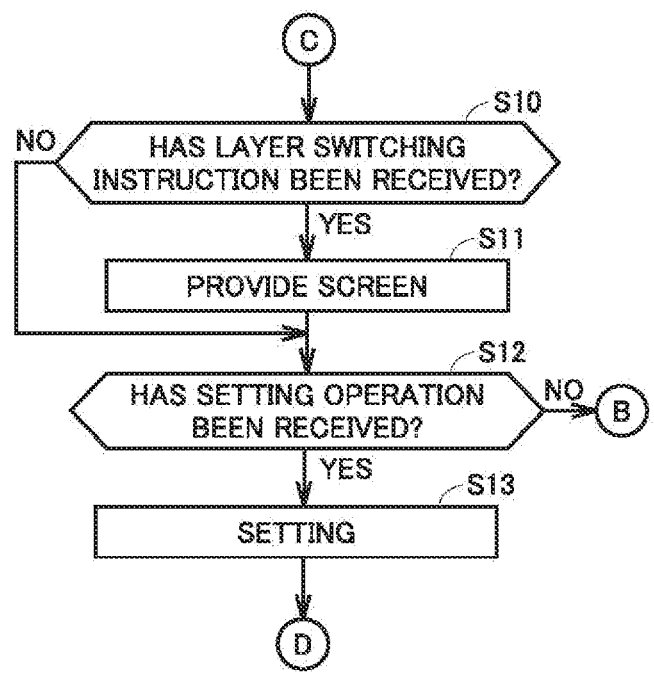
FIG. 8 is a flowchart illustrating the remaining part of the sequence of the setting process performed by the processing apparatus according to the first embodiment.

Referring to FIGS. 6 to 8, a setting process by the processing apparatus 100 will be described. FIG. 6 is a diagram for describing an overview of the setting process performed by the processing apparatus according to the first embodiment.

The processing apparatus 100 includes a providing section 111, a setting section 112, and the storage 13. The providing section 111 and the setting section 112 are implemented by the processor 11 executing the program 131.

The providing section 111 provides a setting screen G for setting one or more items relating to the processing apparatus 100. More specifically, when an instruction to provide the setting screen G (screen request) is received from the external apparatus 500, the providing section 111 generates the first setting screen GP based on the screen element group 132 and the main body information 133, and provides the first setting screen GP to the external apparatus 500. When receiving an instruction to switch to the second setting screen GQ from the external apparatus 500 (for example, when the button P1 is clicked), the providing section 111 generates the second setting screen GQ based on the screen element group 132 and the main body information 133, and provides the second setting screen GQ to the external apparatus 500. When receiving an instruction to switch to the first setting screen GP from the external apparatus 500 (for example, when the button Q1 or the button Q7 is clicked), the providing section 111 generates the first setting screen GP based on the screen element group 132 and the main body information 133, and provides the first setting screen GP to the external apparatus 500. Furthermore, upon receiving a layer switching instruction from the external apparatus 500, the providing section 111 generates a screen corresponding to the layer indicated by the layer switching instruction, based on the screen element group 132 and the main body information 133, and provides the generated screen to the external apparatus 500.

When a setting operation is performed, the setting section 112 sets one or more items set on the setting screen G. To be more specific, when the button P9 is clicked, the processing apparatus 100 sets the item set on the first setting screen GP. In addition, when the button Q9 is clicked, the processing apparatus 100 sets the item set on the second setting screen GQ.

FIG. 7 is a flowchart illustrating a part of a sequence of a setting process performed by the processing apparatus according to the first embodiment. FIG. 8 is a flowchart illustrating the remaining part of the sequence of the setting process performed by the processing apparatus according to the first embodiment. The setting process is executed by the processor 11.

In step S1, the processor 11 determines whether or not an instruction to provide the setting screen has been received. When login is performed on a web page indicated by a predetermined uniform resource locator (URL), the processor 11 determines that an instruction to provide a setting screen has been received. In a case where the instruction to provide the setting screen has been received (YES in step S1), the processor 11 advances the processing to step S2.

In step S2, the processor 11 provides the first setting screen GP to the external apparatus 500. As a result, the first setting screen GP is displayed on the display device 550 of the external apparatus 500.

In step S3, the processor 11 determines whether or not an instruction to switch to the second setting screen GQ has been received. In a case where a signal indicating that the button P1 in the first setting screen GP is clicked is received from the external apparatus 500, the processor 11 determines that the instruction to switch to the second setting screen GQ has been received. In a case where the instruction to switch to the second setting screen GQ has been received (YES in step S3), the processor 11 advances the processing to step S4. On the other hand, in a case where the instruction to switch to the second setting screen GQ has not been received (NO in step S3), the processor 11 advances the processing to step S10.

In step S4, the processor 11 provides the second setting screen GQ to the external apparatus 500. As a result, the second setting screen GQ is displayed on the display device 550 of the external apparatus 500.

In step S5, the processor 11 determines whether or not a layer switching instruction has been received. In a case where a signal indicating that a tab (for example, the tab Q8a, the tab Q8b, the tab Q8c, or the like) in the second setting screen GQ is clicked is received from the external apparatus 500, the processor 11 determines that the layer switching instruction has been received. In a case where the layer switching instruction has been received (YES in step S5), the processor 11 advances the processing to step S6. On the other hand, in a case where the layer switching instruction has not been received (NO in step S5), the processor 11 advances the processing to step S7.

In step S6, the processor 11 provides the external apparatus 500 with the second setting screen GQ corresponding to the tab indicated by the layer switching instruction received in step S5.

In step S7, the processor 11 determines whether a setting operation has been received. In a case where a signal indicating that the button Q9 in the second setting screen GQ is clicked is received from the external apparatus 500, the processor 11 determines that the setting operation has been received. In a case where the setting operation has been received (YES in step S7), the processor 11 advances the processing to step S8. On the other hand, in a case where the setting operation has not been received (NO in step S7), the processor 11 advances the processing to step S9.

In step S8, the processor 11 sets the item set on the second setting screen GQ.

In step S9, the processor 11 determines whether or not an instruction to switch to the first setting screen GP has been received. In a case where a signal indicating that the button Q1 or the button Q7 in the second setting screen GQ is clicked is received from the external apparatus 500, the processor 11 determines that the instruction to switch to the first setting screen GP has been received. In a case where the instruction to switch to the first setting screen GP has been received (YES in step S9), the processor 11 advances the processing to step S2. On the other hand, in a case where the instruction to switch to the first setting screen GP has not been received (NO in step S9), the processor 11 advances the processing to step S5.

In step S10, the processor 11 determines whether or not a layer switching instruction has been received. In a case where a signal indicating that a tab (for example, the tab P8a, the tab P8b, the tab P8c, or the like) in the first setting screen GP is clicked is received from the external apparatus 500, the processor 11 determines that the layer switching instruction has been received. In a case where the layer switching instruction has been received (YES in step S10), the processor 11 advances the processing to step S11. On the other hand, in a case where the layer switching instruction has not been received (NO in step S10), the processor 11 advances the processing to step S12.

In step S11, the processor 11 provides the external apparatus 500 with the first setting screen GP corresponding to the tab indicated by the layer switching instruction received in step S10.

In step S12, the processor 11 determines whether or not a setting operation has been received. In a case where a signal indicating that the button P9 in the first setting screen GP is clicked is received from the external apparatus 500, the processor 11 determines that the setting operation has been received. In a case where the setting operation has been received (YES in step S12), the processor 11 advances the processing to step S13. On the other hand, in a case where the setting operation has not been received (NO in step S12), the processor 11 advances the processing to step S3.

In step S13, the processor 11 sets the item set on the first setting screen GP. After step S8 or step S13, the setting process ends.

In this way, the processing apparatus 100 according to the present embodiment can provide the external apparatus 500 with the first setting screen GP that is easy for a person to operate and the second setting screen GQ on which an operation is easy to record. Therefore, a person can selectively use the setting screen according to the purpose. To be more specific, when a person wants to automate, by the RPA 533, the setting operation for setting one or more items relating to the processing apparatus 100, the person can perform the setting operation by using the second setting screen GQ on which the operation is easily recorded. Since the operation on the second setting screen GQ is easily recorded by the external apparatus 500, it is possible to prevent an unintended operation (erroneous operation) from being performed in the operation automated by the RPA 533. That is, according to the processing apparatus 100 of the present embodiment, in a case where an operation performed on a certain setting screen displayed by a web browser is automated by the RPA, it is possible to prevent an unintended operation (erroneous operation) from being performed.

On the other hand, in a case where the setting operation is not automated, the person can perform the setting operation using the first setting screen GP that is easy to operate. Therefore, the setting operation can be efficiently performed.

Since the setting screen G may be a setting screen for setting one or more items relating to the processing apparatus 100, the setting screen G may be a system setting screen for the processing apparatus 100, a function setting screen for the processing apparatus 100 (for example, a copy function setting screen, a scan function setting screen, or the like), or a screen for registering an address book in the processing apparatus 100.

[First Modification Example of Second Setting Screen in First Embodiment]

Next, a first modification example of the second setting screen according to the first embodiment will be described. The second setting screen GQ shown in FIG. 5 is composed of a plurality of layers similarly to the first setting screen GP shown in FIG. 4. In a case where the first setting screen is composed of a plurality of layers, since the amount of information displayed on one layer is reduced, a person can easily perform an operation.

On the other hand, in a case where the second setting screen is composed of a plurality of layers, since the layout of the screen is changed before and after the layer is switched, there is a possibility that an unintended operation (erroneous operation) is performed in a case where the operation is automated by the RPA 533. Further, a person who registers the operation to be automated using the second setting screen is often familiar with the setting operation. Therefore, in the second setting screen, the easiness of automation of the operation may be prioritized over the easiness of the operation. Therefore, instead of the second setting screen GQ, the processing apparatus 100 may provide the external apparatus 500 with a second setting screen composed of one layer as illustrated in FIG. 9.

Figure 9:
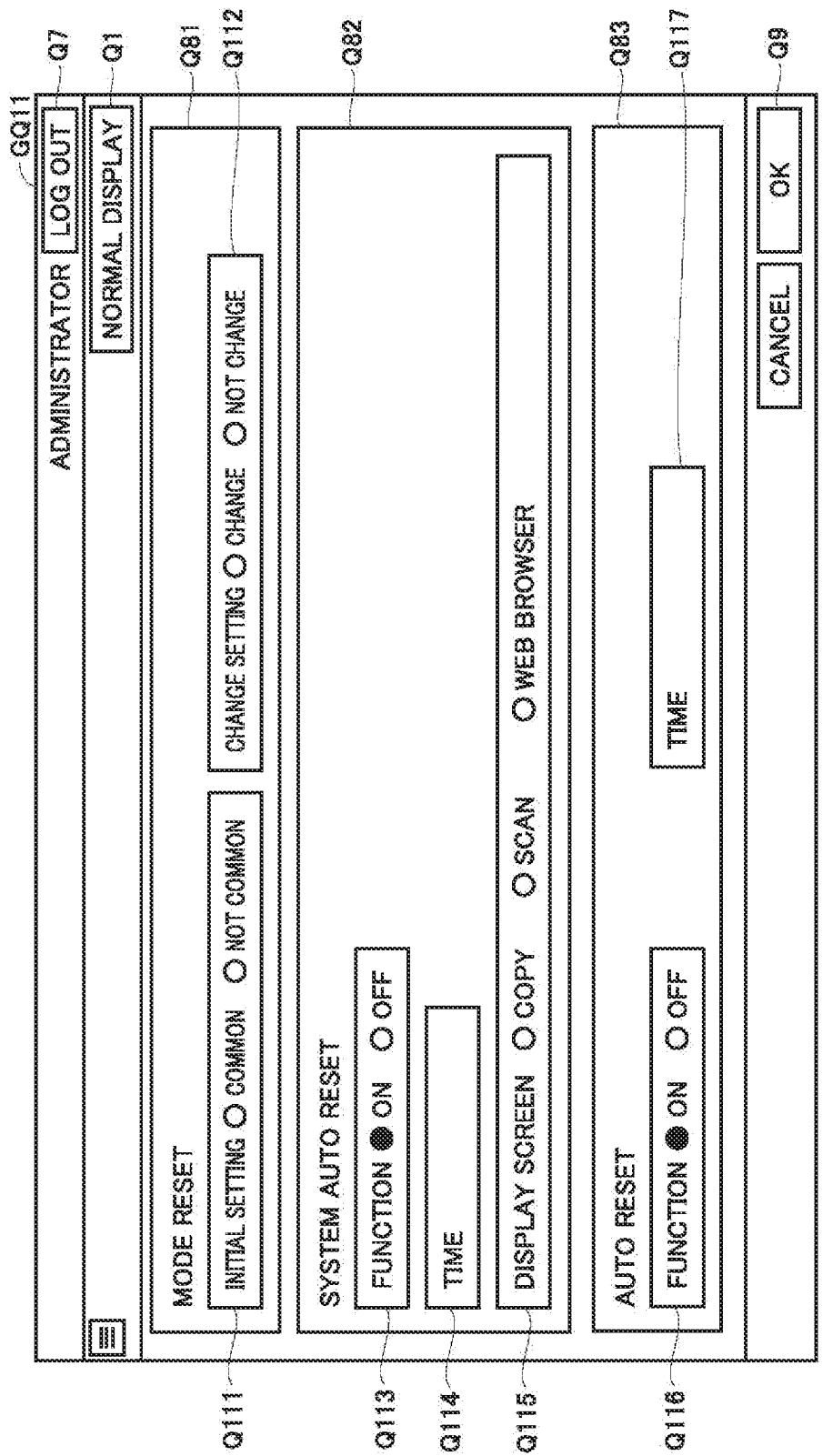
FIG. 9 is a diagram illustrating a first modification example of the second setting screen according to the first embodiment.

FIG. 9 is a diagram illustrating a first modification example of the second setting screen according to the first embodiment. The second setting screen GQ11 is composed of one layer.

In the second setting screen GQ11, the screen of the first layer, the screen of the second layer, and the screen of the third layer in the second setting screen GQ (see FIG. 5) are integrated into one layer. To be more specific, the second setting screen GQ11 includes a setting field Q81, a setting field Q82, and a setting field Q83. The setting field Q81 includes the items (one or more items relating to the mode reset function) included in the screen of the first layer of the second setting screen GQ. The setting field Q82 includes the items (one or more items relating to the system auto reset function) included in the screen of the second layer of the second setting screen GQ. The setting field Q83 includes the items (one or more items relating to the auto reset function) included in the screen of the third layer of the second setting screen GQ.

A user interface in which an operation is easily recorded is used for the setting field Q81, the setting field Q82, and the setting field Q83. More specifically, a radio button Q111 and a radio button Q112 are used in the setting field Q81, a radio button Q113, a text box Q114, and a radio button Q115 are used in the setting field Q82, and a radio button Q116 and a text box Q117 are used in the setting field Q83.

As described above, a user interface that is easy to record an operation is used in the second setting screen GQ11. Therefore, it is possible to prevent an unintended operation (erroneous operation) from being performed in a case where the operation is automated by the RPA 533.

In addition, since one or more items relating to the processing apparatus 100 are integrated and displayed in one layer on the second setting screen GQ11, an operation of switching the layer does not occur. Therefore, it is possible to prevent an unintended operation (erroneous operation) from being performed in a case where the operation is automated by the RPA 533.

[Second Modification Example of Second Setting Screen in First Embodiment]

A second modification example of the second setting screen according to the first embodiment will be described. On the second setting screen GQ illustrated in FIG. 5, similar to the first setting screen GP illustrated in FIG. 4, first options ("copy", "scan", and "web browser" in FIG. 5) relating to functions that are currently available are displayed, and second options (for example, "FAX" and the like) relating to functions that are not currently available but can be added are not displayed.

For this reason, in a case where a function (for example, the FAX function) of the processing apparatus 100 is added by adding an option, there is a possibility that the layout of the second setting screen is changed. For example, while the second option from the top of the radio button Q4 is "scan" in the layout before the option is added, the second option from the top of the radio button Q4 may be "copy" in the layout after the option is added. If the layout of the second setting screen is changed due to the addition of the option, a person is required to register again the operation registered in the external apparatus 500 before the addition of the option in the external apparatus 500, using the second setting screen provided after the addition of the option. In order to save such time and effort for re-registration, the processing apparatus 100 may provide a second setting screen as illustrated in FIG. 10 to the external apparatus 500 instead of the second setting screen GQ.

Figure 10:
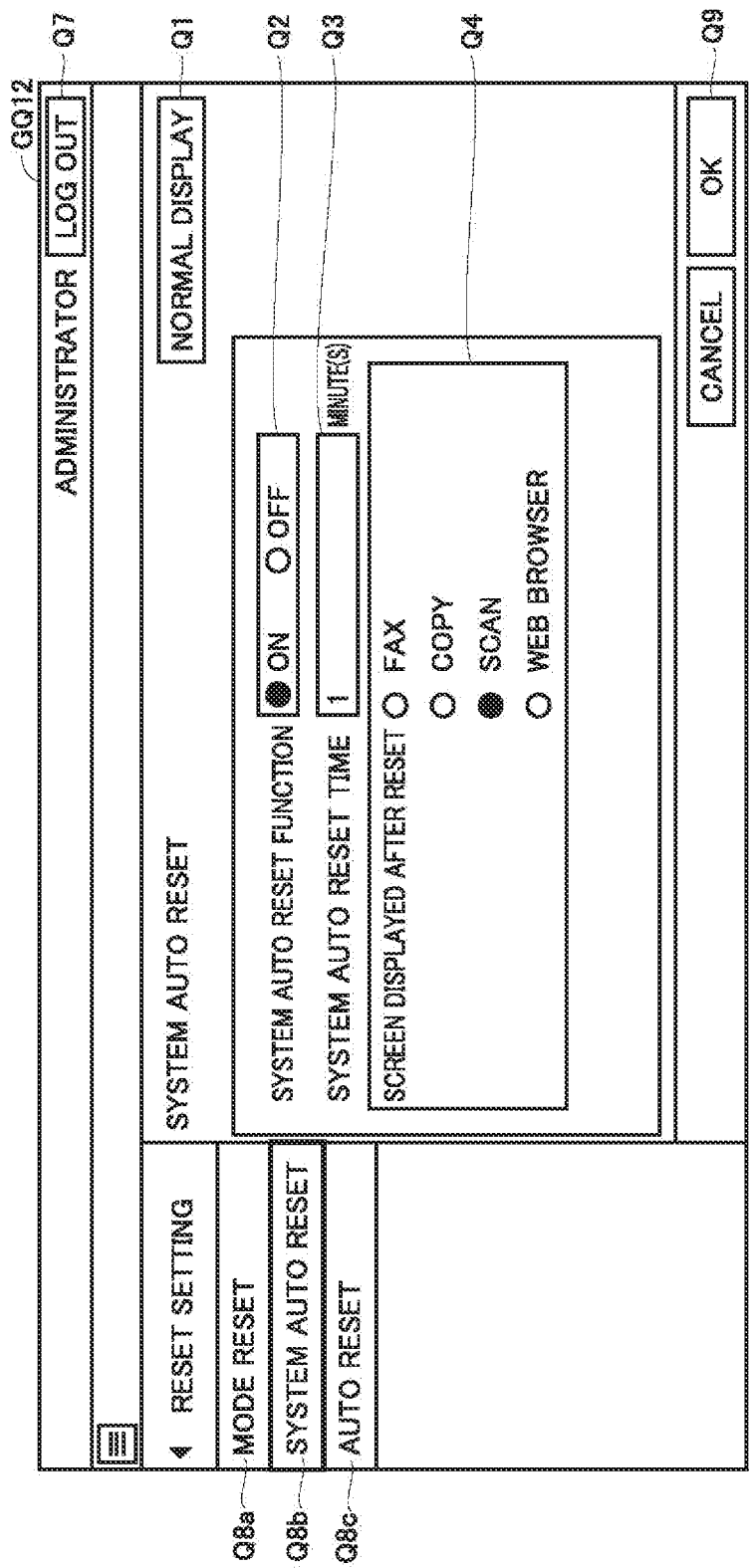
FIG. 10 is a diagram illustrating a second modification example of the second setting screen according to the first embodiment.

FIG. 10 is a diagram illustrating a second modification example of the second setting screen according to the first embodiment. The second setting screen GQ12 is different from the second setting screen GQ shown in FIG. 5 in a plurality of options (a plurality of options included in the radio buttons Q4) relating to the "screen displayed after reset". In the second setting screen GQ12, in addition to first options ("copy", "scan", and "web browser") relating to functions which are currently available, a second option ("FAX") relating to a function which is not currently available but can be added is displayed, as a plurality of options relating to the "screen displayed after reset".

Therefore, even when a new function ("FAX") is made available by addition of an option, the layout of the second setting screen GQ12 is not changed. Therefore, it is not necessary to re-register, in the external apparatus 500 after addition of the option, an operation that has been registered in the external apparatus 500 before addition of the option. Therefore, the burden on a person who re-registers the operation to be automated is reduced.

A person who registers the operation to be automated, using the second setting screen, is often familiar with the setting operation. Therefore, even when the second option relating to a function which is not currently available but can be added is displayed, the person can perform operation without confusion.

Second Embodiment

In the second embodiment, a case will be described where a second setting screen suitable for a user environment (for example, specifications of RPA software installed in an external apparatus, specifications of an input device of the external apparatus, or the like) is provided to the external apparatus. In the description of the second embodiment, the same components as those of the first embodiment are denoted by the same reference characters, and the description thereof will not be repeated.

Figure 11:
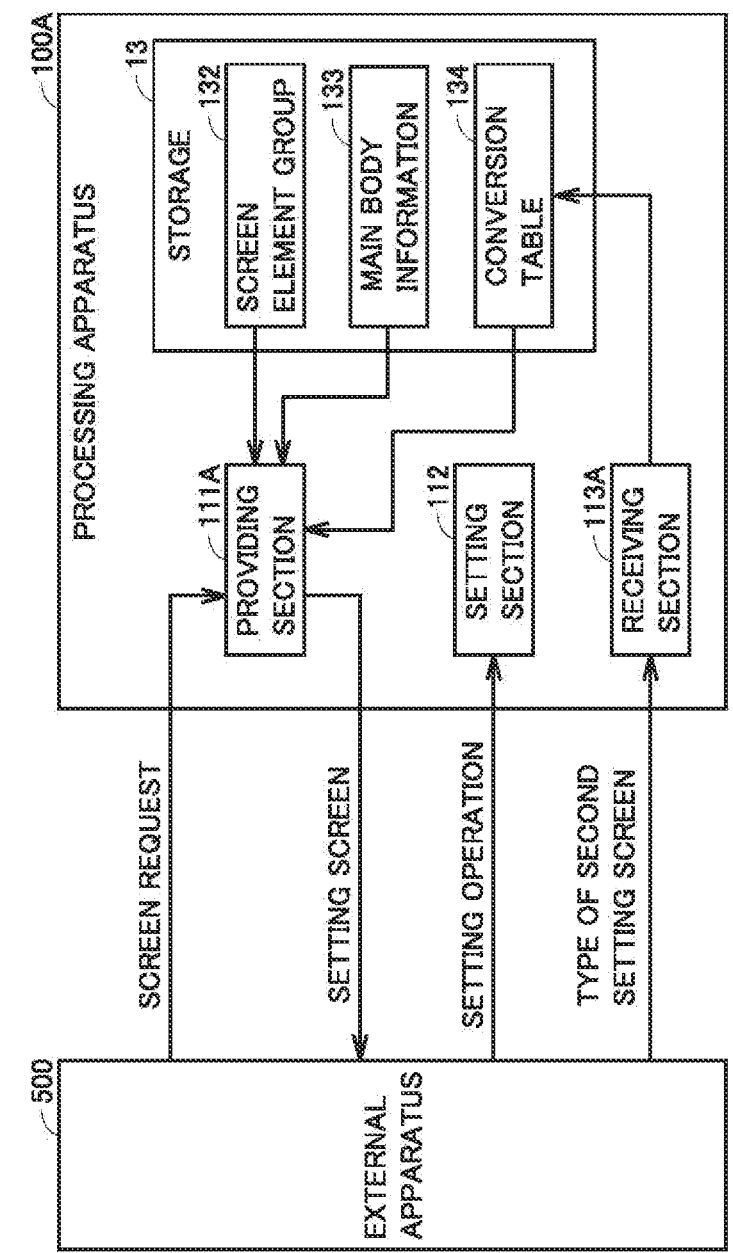
FIG. 11 is a diagram for describing an overview of a setting process performed by a processing apparatus according to a second embodiment.

FIG. 11 is a diagram for describing an overview of a setting process performed by a processing apparatus according to the second embodiment. A setting system in the second embodiment includes the processing apparatus 100A and an external apparatus 500. The processing apparatus 100A has the same hardware configuration as the processing apparatus 100.

The processing apparatus 100A includes a providing section 111A, a setting section 112, a receiving section 113A, and a storage 13. The providing section 111A, the setting section 112, and the receiving section 113A are implemented by the processor 11 executing the program 131. The storage 13 stores a screen element group 132, main body information 133, and a conversion table 134.

The receiving section 113A receives designation of the type of the second setting screen to be provided to the external apparatus 500. A person specifies the type of the second setting screen using the input device 540 of the external apparatus 500. The receiving section 113A stores the received type in the conversion table 134.

Here, the conversion table 134 will be described with reference to FIG. 12. FIG. 12 is a diagram illustrating an example of the conversion table according to the second embodiment. The conversion table 134 includes an identification number of the external apparatus 500 and a type of the second setting screen.

Referring again to FIG. 11, the providing section 111A provides a setting screen G for setting one or more items relating to the processing apparatus 100A. To be more specific, when an instruction to provide the setting screen G (screen request) is received from the external apparatus 500, the providing section 111A generates the first setting screen GP based on the screen element group 132 and the main body information 133, and provides the first setting screen GP (see FIG. 4) to the external apparatus 500. In the first and second embodiments, the first setting screen provided to the external apparatus 500 is the same.

Figure 13:
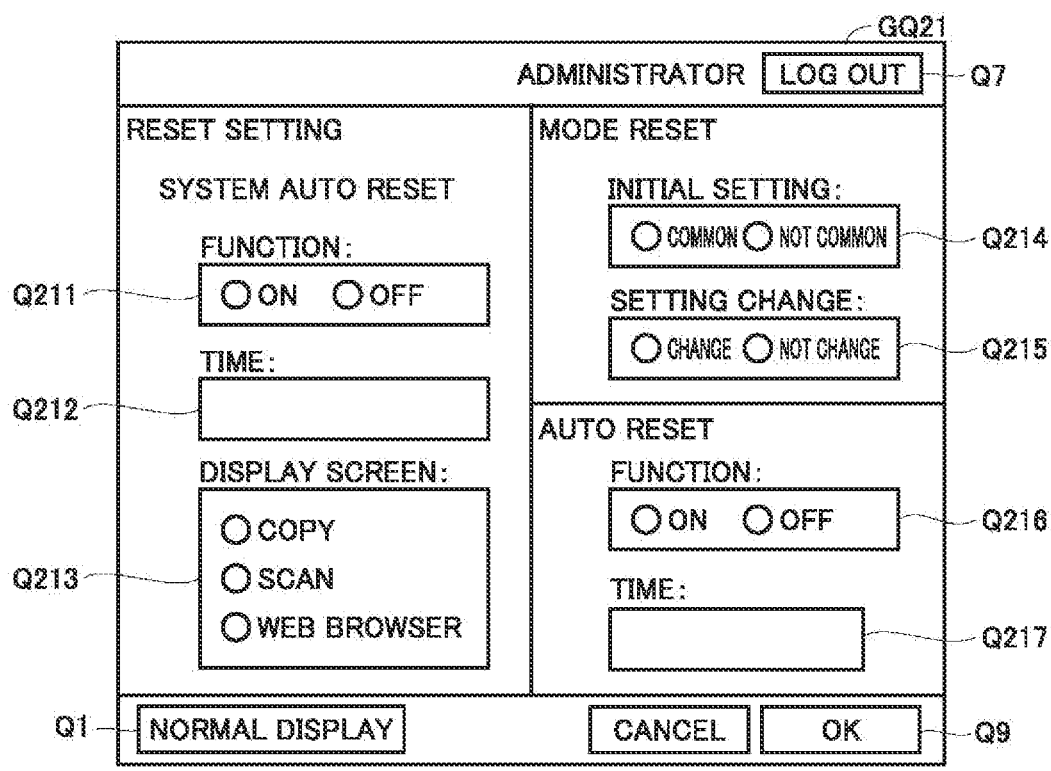
FIG. 13 is a diagram illustrating an example of a second setting screen according to the second embodiment.
Figure 14:
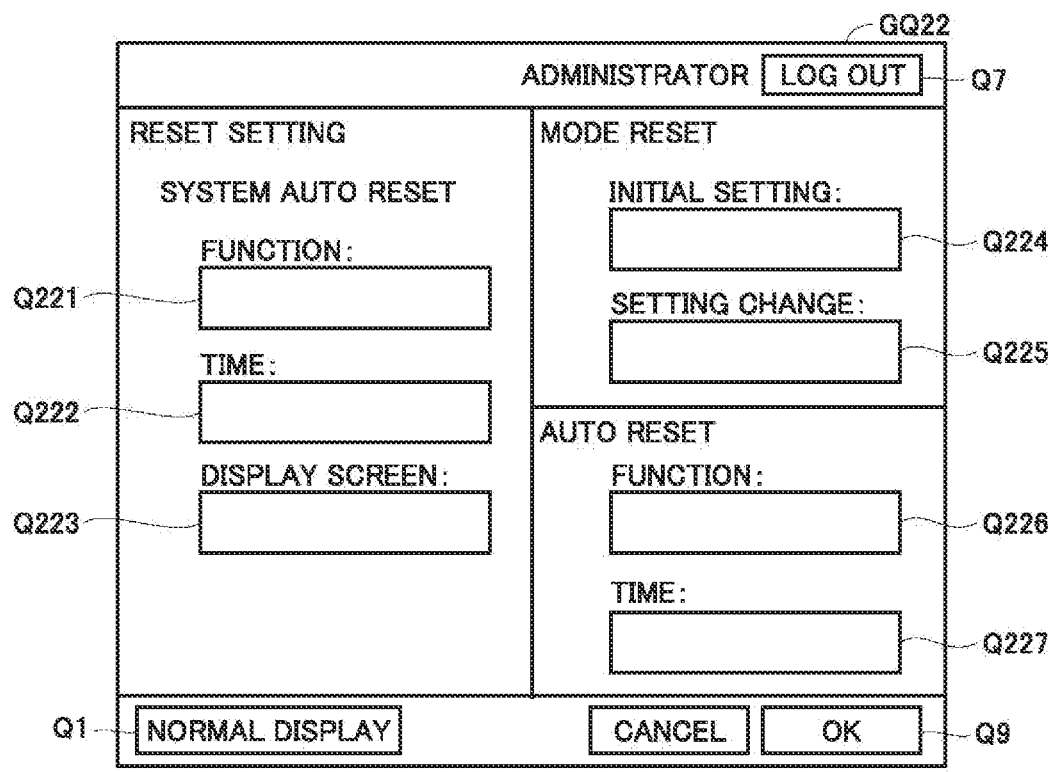
FIG. 14 is a diagram illustrating another example of the second setting screen according to the second embodiment.

When an instruction to switch to the second setting screen is received from the external apparatus 500 (for example, when the button P1 is clicked), the providing section 111A specifies the type of the second setting screen corresponding to the external apparatus 500 with reference to the conversion table 134, generates the second setting screen corresponding to the type based on the screen element group 132 and the main body information 133, and provides the second setting screen corresponding to the type to the external apparatus 500. When the providing section 111A receives an instruction to switch to the first setting screen GP from the external apparatus 500 (for example, when the button Q1 or the button Q7 in FIGS. 13 and 14 is clicked), the providing section 111A generates the first setting screen GP based on the screen element group 132 and the main body information 133, and provides the first setting screen GP to the external apparatus 500. Furthermore, upon receiving a layer switching instruction from the external apparatus 500, the providing section 111A generates a screen corresponding to the layer indicated by the layer switching instruction, based on the screen element group 132 and the main body information 133, and provides the generated screen to the external apparatus 500.

The sequence of the setting process performed by the processing apparatus 100A according to the second embodiment is the same as the sequence illustrated in FIGS. 7 and 8.

Referring to FIGS. 13 and 14, two types of the second setting screen in the second embodiment will be described. FIG. 13 is a diagram illustrating an example of the second setting screen according to the second embodiment. FIG. 14 is a diagram illustrating another example of the second setting screen according to the second embodiment.

In the second setting screen GQ21, radio buttons and text boxes are used as elements for setting one or more items relating to the processing apparatus 100A. To be more specific, on the second setting screen GQ21, a radio button Q211, a text box Q212, a radio button Q213, a radio button Q214, a radio button Q215, a radio button Q216, and a text box Q217 are used.

In contrast, on the second setting screen GQ22, only the text boxes are used as elements for setting one or more items relating to the processing apparatus 100A. To be more specific, on the second setting screen GQ22, a text box Q221, a text box Q222, a text box Q223, a text box Q224, a text box Q225, a text box Q226, and a text box Q227 are used.

There is a case where the RPA 533 incorporated in the external apparatus 500 is not adapted to the operation of the radio button. In such a case, when the operation on the second setting screen GQ21 is recorded in the external apparatus 500, the operation of the radio button is not recorded, or even in a case where the operation is recorded, the intended operation is not performed in a case where the re-execution is performed. Therefore, in a case where an operation on the second setting screen GQ21 in which the radio button is used is automated by the RPA 533 that is not adapted to the operation of the radio button, an unintended operation (erroneous operation) is consequently performed.

In a case where the RPA 533 incorporated in the external apparatus 500 is not adapted to the operation of the radio button, a person may specify the second setting screen GQ22 in which only the text boxes are used, and thus all the operations can be automated by the RPA 533. Therefore, it is possible to prevent an unintended operation (erroneous operation) from being performed in the operation automated by the RPA 533.

Further, in a case where the input device 540 of the external apparatus 500 includes only a mouse and a numeric keypad, a person designates a second setting screen (for example, the second setting screen GQ21 or the like) in which a text box is used for inputting a numerical value and a radio button is used for selecting an option, whereby all operations can be automated by the RPA 533. Therefore, it is possible to prevent an unintended operation (erroneous operation) from being performed in the operation automated by the RPA 533.

As described above, the processing apparatus 100A according to the second embodiment receives the designation of the type of the second setting screen to be provided to the external apparatus 500, and provides the second setting screen corresponding to the type to the external apparatus 500. Therefore, the second setting screen suitable for the user environment is provided to the external apparatus 500. Therefore, according to the processing apparatus 100A in the second embodiment, when an operation performed on a certain setting screen displayed by the web browser is automated by the RPA 533, it is possible to prevent an unintended operation (erroneous operation) from being performed in the operation automated by the RPA 533.

The types of the second setting screen are not limited to the two types, i.e., the second setting screen GQ21 and the second setting screen GQ22. There may be two or more types of the second setting screen.

Although the second setting screen GQ21 and the second setting screen GQ22 are composed of one layer, the second setting screen in the second embodiment may also be composed of a plurality of layers.

In the second setting screen according to the second embodiment, the first options relating to the functions that are currently available may be displayed, and the second options relating to the functions that are not currently available but can be added may not be displayed. Further, in the second setting screen according to the second embodiment, both the first options relating to the functions that are currently available and the second options relating to the functions that are not currently available but can be added may be displayed.

Further, also in the second embodiment, since the setting screen G may be a setting screen for setting one or more items relating to the processing apparatus 100A, the setting screen G may be a system setting screen for the processing apparatus 100A, a function setting screen for the processing apparatus 100A (for example, a copy function setting screen, a scan function setting screen, or the like), or a screen for registering an address book in the processing apparatus 100A.

Supplementary Note

The above-described embodiments and modification examples include the following technical ideas.

Configuration 1

A processing apparatus comprising:
a storage that stores a plurality of instructions; and
a processor that executes the plurality of instructions, wherein
the plurality of instructions, when executed by the processor, cause the processor to perform:
providing a setting screen for setting one or more items relating to the processing apparatus; and
setting the one or more items in response to operation performed on the setting screen, and
the setting screen includes
a first setting screen for receiving operation performed by a person, and
a second setting screen for receiving operation automated by Robotic Process Automation.

Configuration 2

The processing apparatus according to configuration 1, wherein the processing apparatus includes an image processing apparatus.

Configuration 3

The processing apparatus according to configuration 1 or 2, wherein
the first setting screen includes an element for switching to the second setting screen, and
the providing the setting screen includes providing the second setting screen in response to operation performed on the element of the first setting screen.

Configuration 4

The processing apparatus according to any one of configurations 1 to 3, wherein the second setting screen is composed of one layer.

Configuration 5

The processing apparatus according to any one of configurations 1 to 4, wherein the first setting screen is composed of a plurality of layers.

Configuration 6

The processing apparatus according to any one of configurations 1 to 5, wherein
the one or more items include a plurality of items,
the first setting screen is composed of a plurality of layers in which the plurality of items are displayed respectively, and
the second setting screen is composed of one layer in which the plurality of items are displayed.

Configuration 7

The processing apparatus according to any one of configurations 1 to 6, wherein
the one or more items include an item for selecting one or more options from a plurality of options,
the plurality of options include a first option relating to a function that is currently available and a second option relating to a function that is not currently available but can be added, and
the first option is displayed on the first setting screen, and the second option is not displayed on the first setting screen, and
both the first option and the second option are displayed on the second setting screen.

Configuration 8

The processing apparatus according to any one of configurations 1 to 7, wherein the second setting screen is less than the first setting screen, in terms of an amount of displayed contents for assisting setting operation.

Configuration 9

The processing apparatus according to any one of configurations 1 to 8, wherein
the second setting screen includes a plurality of types of second setting screens, and
the plurality of instructions, when executed by the processor, further cause the processor to receive designation of a type of the second setting screen to be provided, among the plurality of types of second setting screens.

Configuration 10

A setting system comprising:
the processing apparatus according to any one of configurations 1 to 9; and
an external apparatus that displays the setting screen for the processing apparatus.

Configuration 11

A setting method for a processing apparatus, the setting method comprising:
providing a setting screen for setting one or more items relating to the processing apparatus; and
setting the one or more items in response to operation performed on the setting screen, wherein the setting screen includes
a first setting screen for receiving operation performed by a person, and
a second setting screen for receiving operation automated by Robotic Process Automation.

Configuration 12

A non-transitory computer-readable information recording medium storing a plurality of instructions wherein, the plurality of instructions, when executed by a processor, cause the processor to perform:
providing a setting screen for setting one or more items relating to a processing apparatus; and
setting the one or more items in response to operation performed on the setting screen, and
the setting screen includes
a first setting screen for receiving operation performed by a person, and
a second setting screen for receiving operation automated by Robotic Process Automation.

Although embodiments of the present invention have been described and illustrated in detail, the disclosed embodiments are made for purposes of illustration and example only and not limitation. The scope of the present invention should be interpreted by terms of the appended claims

What is claimed is:

1. A processing apparatus comprising: a storage that stores a plurality of instructions for operating the processing apparatus; and a processor that executes the plurality of instructions, wherein the plurality of instructions, when executed by the processor, cause the processor to perform: providing a setting screen for setting one or more operation setting items relating to operation of the processing apparatus; transmitting the setting screen to an external apparatus, on which external apparatus the setting operations relating to operation of the processing apparatus are set on the setting screen; and setting the one or more operation setting items in response to an operation performed on the setting screen, and the setting screen includes a first setting screen for receiving operations for setting operation settings called for by the operation setting items for operation of the processing apparatus, wherein the received operations are performed by a person, and a second setting screen for receiving operations for setting operation settings called for by the operation setting items for operation of the processing apparatus, wherein the received operations are automated by Robotic Process Automation; wherein the first setting screen includes at least one element for switching to the second setting screen, and optionally includes additional elements for switching to additional setting screen layers; wherein the providing the setting screen includes providing the second setting screen in response to operation performed on the at least one element of the first setting screen; wherein the second setting screen is composed of only one layer so that all setting fields displayed on the second setting screen can be set without having to resort to another layer or setting screen;
wherein: the setting screen enables setting a plurality of operation setting items relating to operation of the processing apparatus; the first setting screen includes the additional elements for switching to the additional setting screen layers; all of the operation setting items from the additional screen layers are integrated into the second setting screen; not all of the plurality of operation setting items can be set from the first setting screen; the plurality of operation setting items can be set from the first setting screen and the additional screen layers; and all of the plurality of operation setting items can be set from the second setting screen.

2. The processing apparatus according to claim 1, wherein the processing apparatus includes an image processing apparatus.

3. The processing apparatus according to claim 1, wherein the one or more operation setting items include a plurality of items,
the first setting screen is composed of a plurality of layers in which a plurality of operation setting items are displayed respectively, and
the second setting screen is composed of one layer in which a plurality of operation setting items are displayed at one time.

4. The processing apparatus according to claim 1, wherein the one or more operation setting items include an item for selecting one or more options from a plurality of options,
the plurality of options include a first option relating to a function that is currently available and a second option relating to a function that is not currently available but can be added, and
the first option is displayed on the first setting screen, and the second option is not displayed on the first setting screen, and
both the first option and the second option are displayed on the second setting screen.

5. The processing apparatus according to claim 1, wherein the second setting screen is less than the first setting screen, in terms of an amount of displayed contents for assisting setting operation.

6. The processing apparatus according to claim 1, wherein the second setting screen includes a plurality of types of second setting screens, and
the plurality of instructions, when executed by the processor, further cause the processor to receive designation of a type of the second setting screen to be provided, among the plurality of types of second setting screens.

7. A setting system comprising:
the processing apparatus according to claim 1; and
an external apparatus that displays the setting screen for the processing apparatus.

8. A setting method for a processing apparatus, the setting method comprising: using the processing apparatus to provide a setting screen for setting one or more operation setting items relating to the processing apparatus; transmitting the setting screen to an external apparatus, on which external apparatus the setting operations relating to operation of the processing apparatus are set on the setting screen; and using the processing apparatus to set the one or more operation setting items in response to operation performed on the setting screen, wherein the setting screen includes a first setting screen for receiving operations for setting operation settings called for by the operation setting items for operation of the processing apparatus, wherein the received operations are performed by a person, and a second setting screen for receiving operations for setting operation settings called for by the operation setting items for operation of the processing apparatus, wherein the received operations are automated by Robotic Process Automation; wherein the first setting screen includes at least one element for switching to the second setting screen, and optionally includes additional elements for switching to additional setting screen layers; wherein the providing the setting screen includes providing the second setting screen in response to operation performed on the at least one element of the first setting screen; wherein the second setting screen is composed of only one layer so that all setting fields displayed on the second setting screen can be set without having to resort to another layer or setting screen;

wherein: the setting screen enables setting a plurality of operation setting items relating to operation of the processing apparatus; the first setting screen includes the additional elements for switching to the additional setting screen layers; all of the operation setting items from the additional screen layers are integrated into the second setting screen; not all of the plurality of operation setting items can be set from the first setting screen; the plurality of operation setting items can be set from the first setting screen and the additional screen layers; and all of the plurality of operation setting items can be set from the second setting screen.

9. The setting method according to claim 8, wherein the processing apparatus includes an image processing apparatus.

10. The setting method according to claim 8, wherein
the one or more items include a plurality of items,
the first setting screen is composed of a plurality of layers in which a plurality of items are displayed respectively, and
the second setting screen is composed of one layer in which a plurality of items are displayed.

11. The setting method according to claim 8, wherein
the one or more operation setting items include an item for selecting one or more options from a plurality of options,
the plurality of options include a first option relating to a function that is currently available and a second option relating to a function that is not currently available but can be added, and
the first option is displayed on the first setting screen, the second option is not displayed on the first setting screen, and both the first option and the second option are displayed on the second setting screen.

12. The setting method according to claim 8, wherein the second setting screen is less than the first setting screen, in terms of an amount of displayed contents for assisting setting operation.

13. The setting method according to claim 8, wherein
the second setting screen includes a plurality of types of second setting screens, and
the setting method further comprises receiving designation of a type of the second setting screen to be provided, among the plurality of types of second setting screens.

14. A non-transitory computer-readable information recording medium storing a plurality of instructions wherein, the plurality of instructions, when executed by a processor, cause the processor to perform: using a processing apparatus to provide a setting screen for setting one or more operation setting items relating to a processing apparatus; transmitting the setting screen to an external apparatus, on which external apparatus the setting operations relating to operation of the processing apparatus are set on the setting screen; and using the processing apparatus to set the one or more operation setting items in response to operation performed on the setting screen, and the setting screen includes a first setting screen for receiving operations for setting operation settings called for by the operation setting items for operation of the processing apparatus, wherein the received operations are performed by a person, and a second setting screen for receiving operations for setting operation settings called for by the operation setting items for operation of the processing apparatus, wherein the received operations are automated by Robotic Process Automation; wherein the first setting screen includes at least one element for switching to the second setting screen, and optionally includes additional elements for switching to additional setting screen layers; wherein the providing the setting screen includes providing the second setting screen in response to operation performed on the at least one element of the first setting screen; wherein the second setting screen is composed of only one layer so that all setting fields displayed on the second setting screen can be set without having to resort to another layer or setting screen;

wherein: the setting screen enables setting a plurality of operation setting items relating to operation of the processing apparatus; the first setting screen includes the additional elements for switching to the additional setting screen layers; all of the operation setting items from the additional screen layers are integrated into the second setting screen; not all of the plurality of operation setting items can be set from the first setting screen; the plurality of operation setting items can be set from the first setting screen and the additional screen layers; and all of the plurality of operation setting items can be set from the second setting screen.

* * * * *